United States Patent [19]

Bottomley

[11] 4,056,064
[45] Nov. 1, 1977

[54] TRANSVERSELY REMOVABLE GANTRY LOADER

[75] Inventor: Herbert Geoffrey Bottomley, Skipton, England

[73] Assignee: Landis Lund, Limited, Keighley, England

[21] Appl. No.: 739,668

[22] Filed: Nov. 8, 1976

Related U.S. Application Data

[63] Continuation of Ser. No. 555,318, March 4, 1975, abandoned.

[30] Foreign Application Priority Data

Mar. 9, 1974 United Kingdom ............... 10646/74

[51] Int. Cl.² ............................................. E01B 25/22
[52] U.S. Cl. ..................................... 104/93; 104/121; 104/246; 105/146
[58] Field of Search ................... 104/89, 95, 107, 244; 105/141, 146, 147

[56] References Cited

U.S. PATENT DOCUMENTS

| 2,761,395 | 9/1956 | Peck | 104/246 |
| 3,212,455 | 10/1965 | Workman | 104/89 X |
| 3,563,179 | 2/1971 | Gorjanc | 105/155 |
| 3,890,904 | 6/1975 | Edwards | 104/121 |
| 4,000,702 | 1/1977 | Machintoch | 104/89 X |

Primary Examiner—Robert J. Spar
Assistant Examiner—Carl Rowold
Attorney, Agent, or Firm—Spencer T. Smith

[57] ABSTRACT

A gantry loader comprising a horizontally disposed support beam, a railway rail secured to the support beam, the rail including a head, a loader assembly including a carriage selectively displaceable along the beam, the carriage having a first pair of wheels for rollingly engaging the face of the rail head, a second pair of wheels for rollingly engaging one projecting portion of the head, a third pair of wheels for rollingly engaging the other projecting portion of the head, each of the third pair of wheels including a peripheral step selectively facing the first pair of wheels and having a beveled side wall surface, the third pair of wheels being selectively displaceable from a retracted position remote from the rail to an advanced position whereat the base and the beveled side wall surface of the step engage the other projecting head portion, and means for selectively maintaining the third pair of wheels at the advanced position.

5 Claims, 5 Drawing Figures

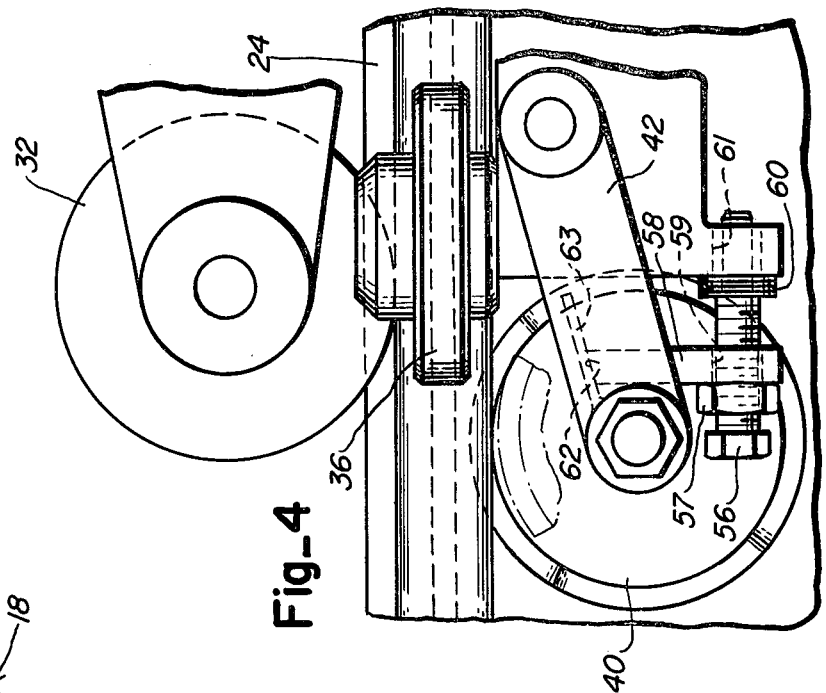
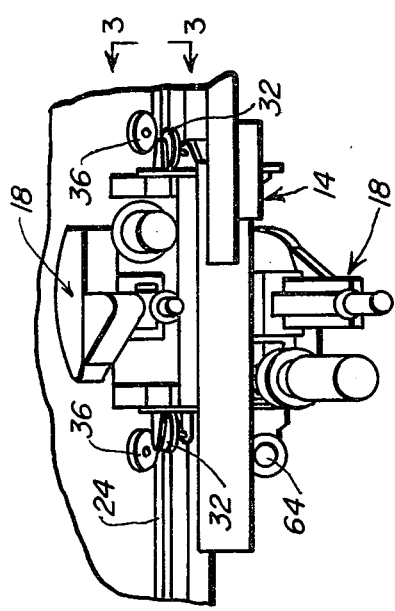
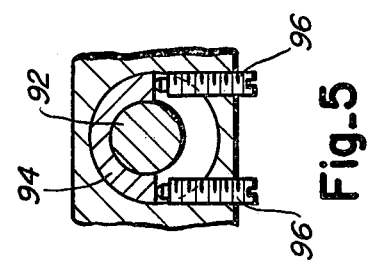
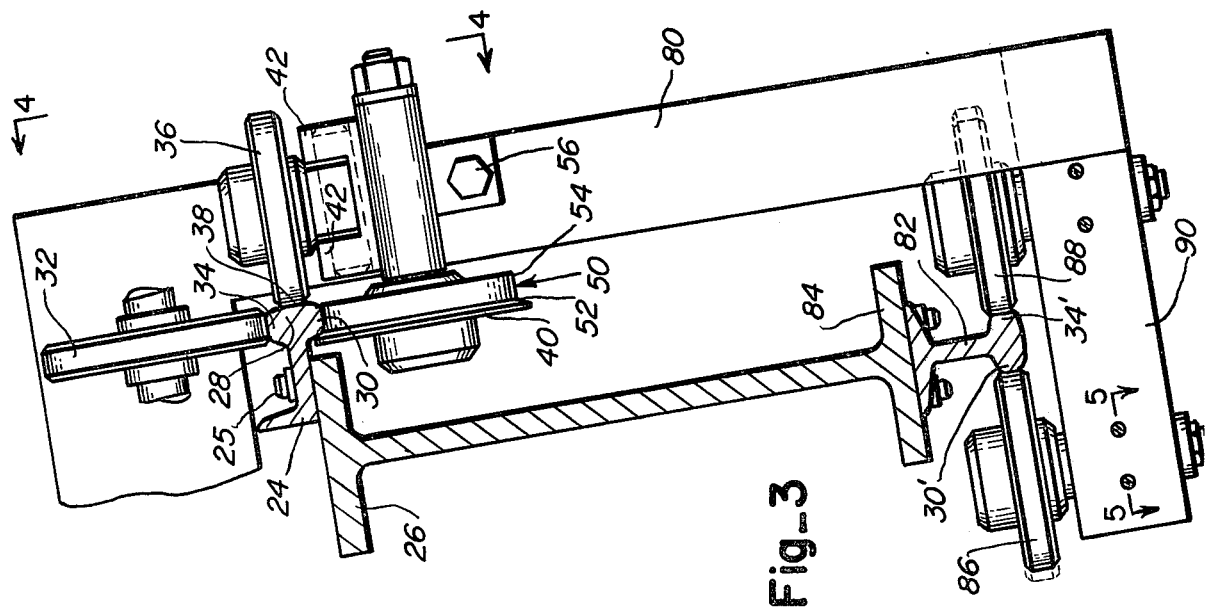

TRANSVERSELY REMOVABLE GANTRY LOADER

This is a continuation of application Ser. No. 555,318, filed Mar. 4, 1975, now abandoned.

The present invention relates to workpiece handling devices, and more particularly, to gantry loaders for supplying unmachined workpieces to and removing machined workpieces from machine tools.

It is an object of the present invention to provide a gantry loader having a horizontally disposed beam structure supporting a loader assembly, wherein the loader assembly can be readily removed from the beam structure.

Among the advantages of the present invention is the provision of a gantry loader, wherein the loader assembly's movements along the beam structure are extremely stable.

Other objects and advantages of the present invention will become apparent from the following portion of this specification and from the accompanying drawings, which illustrate in accordance with the mandate of the patent statutes, a presently preferred embodiment incorporating the principles of the invention.

Referring to the drawings:

FIG. 2 is a top view of a portion of the gantry loader illustrated in FIG. 1;

FIG. 3 is a side view of a portion of the gantry loader taken along the lines 3—3 of FIG. 2;

FIG. 4 is a view of a portion of the gantry loader taken along the lines 4—4 of FIG. 3; and FIG. 5 is a cross-sectional view taken along the lines 5—5 of FIG. 3.

Figure 1:
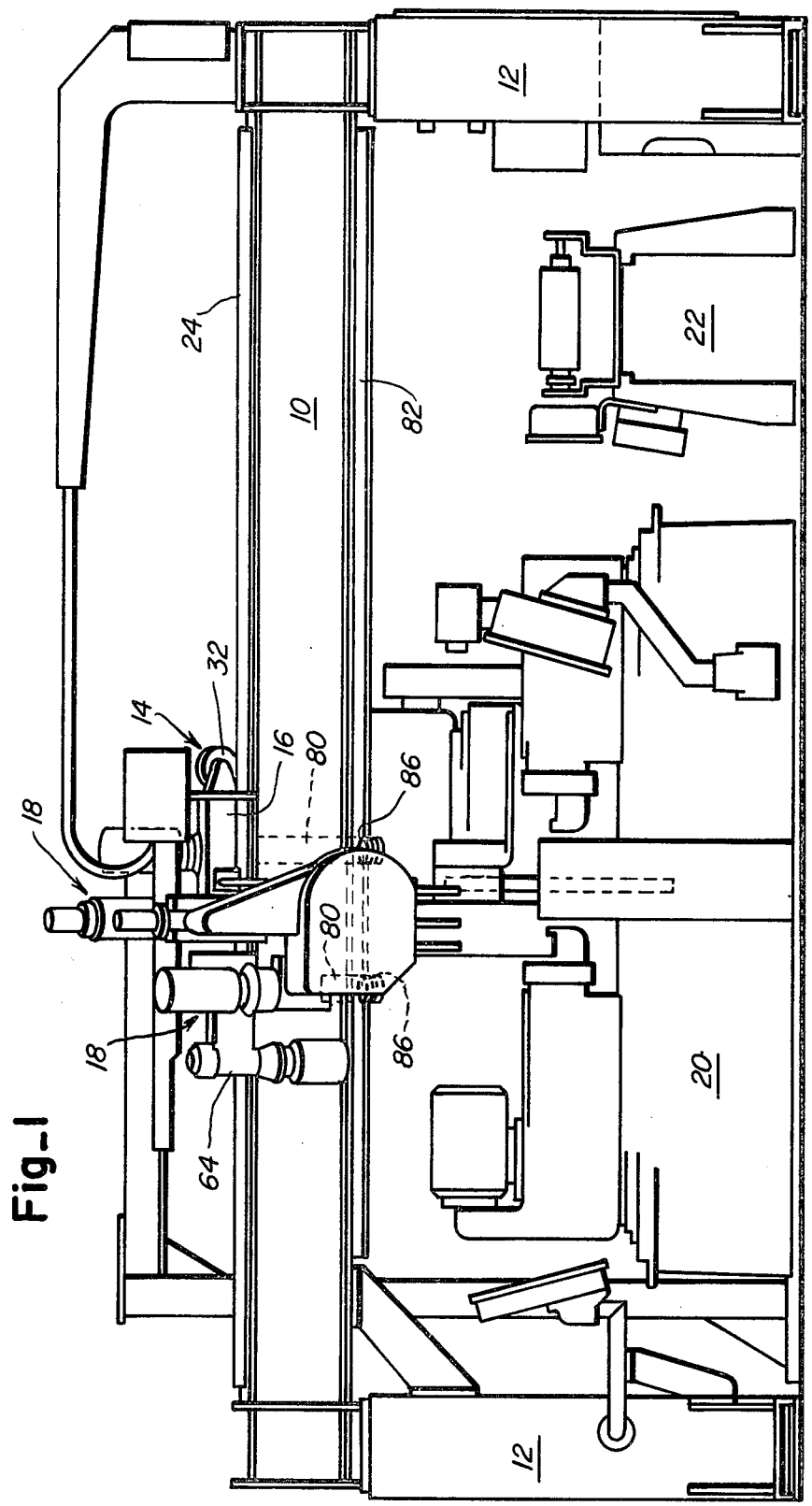
FIG. 1 is a front elevational view of a gantry loader made in accordance with the teachings of the present invention.

The gantry loader illustrated in FIG. 1 includes a rolled steel Universal section (I beam) 10, which is horizontally supported by a pair of pillars 12. The beam 10 supports a loader assembly 14, which includes a carriage 16 and two ram assemblies 18, which are detachably mounted on the carriage. The gantry loader, for purposes of illustration, operates between a crankpin grinding machine 20 and a conveyor assembly 22.

A first flat bottom railway rail 24 is secured by welding and screws 25, to the top surface of the upper flange 26 of the I beam (FIG. 3) with the head 28 of the rail being oriented substantially vertically and being spaced from the upper flange a distance sufficient to provide a clearance between the downwardly projecting head portion 30 of the rail and the upper flange.

A first pair of wheels 32 are rotatably mounted at each end of the carriage 16 for rolling engagement with the top surface of the upwardly projection head portion 34, a second pair of wheels 36 (FIGS. 2, 3 and 4) are rotatably mounted on each side of the carriage for rolling engagement with the face 38 of the head, and a third set of wheels 40 (FIGS. 3 and 4) are rotatably mounted on pivot arm structures 42, which are pivotally secured to each end of the carriage, for rolling engagement with the bottom surface of the downwardly projecting head portion. The third pair of wheels has a peripheral exteriorly facing step 50 having a selectively inclined or beveled side wall 52. The third pair of wheels can be pivotally raised from a lowered or retracted position illustrated in dotted lines in FIG. 4 to an upper or advanced position where the base 54 and beveled surface of the peripheral wheel step 50 rollingly engage the downwardly projecting head portion 30 by selectively advancing a bolt 56 or the like. The bolt 56 is threadedly received by a nut 57 which is welded to a control member 58 and passes through a bore 59 in the control member 58, a plurality of disc springs 60, and a through hole 61 in the side wall of the carriage 16. The control member extends upwardly between opposing arms of the pivot arm structure 42 and the top surface 62 of the control member is selectively inclined to matingly engage the bottom surface of a stop structure 63 which is integral with and extends between the arms of the pivot arm structure. Advancement of the bolt accordingly raises the third wheel and retraction of the bolt lowers the wheel.

One of the first set of wheels is connected by means of associated transmission gearing to the drive shaft of an electric motor 64 having a reversible drive. Actuation of the electric motor causes the drive wheel to rotate and drive the carriage along the beam between two terminal stations.

Referring to FIGS. 1 and 2 of the drawings, the ram assemblies are of unit construction and are mounted in back to front relationship on opposing sides of the beam. The beam may be canted relative to the vertical axis as shown in FIG. 3 into an "optimum support position". This "optimum support position" is the closest position obtainable by the beam relative to a workpiece while maintaining adequate clearance to allow a workpiece to be loaded and/or unloaded from the grinding machine and the conveyor assembly. By mounting the beam as close as possible to the workpiece, the ram stroke of the ram assemblies is kept as short as possible with consequent increased stability during the ram movement.

The carriage includes a pair of spaced L-shaped support members 80 which extend downwardly proximate one side of the I beam and beneath a second railroad rail 82 (FIG. 3), which has been centrally secured to the bottom surface of the lower flange 84 of the I beam. Fourth 86 and fifth 88 pairs of wheels are rotatably mounted on the base portion 90 of the spaced L-shaped support members for rolling engagement with the opposing, outwardly projecting portions 30', 34' of the second rail 82. These wheels are rotatably supported on swivel pins 92 which are located within eccentrically mounted bushings 94 (FIG. 5). Retraction of the fourth and fifth pairs of wheels away from rolling engagement with the second rail and to retracted positions illustrated in FIG. 3, can be achieved by selectively advancing or retracting the control screws 96.

The loader assembly can be removed from the I beam by removing the ram assemblies from the work carriage, lowering the third set of wheels to their retracted position displacing the fourth and fifth pairs of wheels to their retracted position and lifting the carriage from the I beam.

What is claimed is:
1. A gantry loader comprising
   a horizontally disposed support beam,
   a railway rail secured to said support beam, said rail including a straight portion terminating in a head having an end face extending substantially perpendicularly to said straight portion and opposing portions projecting in a direction parallel to said end face outwardly beyond said straight portion, and having substantially flat surfaces parallel to said straight portion,
   a loader assembly including a carriage selectively displaceable along said beam, said carriage having a first wheel mounted for rotation about an axis parallel to said straight portion and having a substantially flat surface for rollingly engaging the flat surface of one projecting portion of said head, a second wheel mounted for rotation about an axis perpendicular to said straight portion for rollingly engaging the face of said rail head, a third wheel mounted for rotation about an axis parallel to said straight portion for rollingly engaging the flat surface of the other projecting portion of said head, said third wheel including a peripheral step having a base portion selectively facing the flat surface of said other projecting portion and having a side wall surface for rollingly engaging the side of said head opposite from said end face, said third wheel being selectively displaceable in a plane perpendicular to its axis from a retracted position remote from said rail whereat said loader assembly can be transversely displaced away from said rail to an advanced position whereat the base and side wall surface of said step engage said other projecting portion to prevent the disassociation of said loader assembly from said rail, and means for selectively maintaining said third wheel at said advanced position.

2. A gantry loader according to claim 1, further comprising means for advancing said third wheel from said retracted position to said advanced position.

3. A gantry loader according to claim 1, wherein said support beam is an I beam.

4. A gantry loader according to claim 3, wherein said I beam is oriented substantially vertically and said railway rail is secured to the top surface thereof with said head extending substantially vertically and being in spaced relation to one side of said flange.

5. A gantry loader according to claim 4, wherein said carriage further comprises support means extending downwardly along said one side of and beneath said I beam, a second railway rail secured to the bottom flange of said I beam, said rail having a head, a fourth wheel rotatably mounted on said support means for rollingly engaging a portion of said second rail head facing the other side of said I beam, and a fifth wheel rotatably mounted on said support means for rollingly engaging a portion of said second rail head facing the one side of said I beam.

* * * * *